United States Patent
Blachman et al.

(10) Patent No.: US 6,632,368 B2
(45) Date of Patent: *Oct. 14, 2003

(54) PROCESS FOR REMOVING FLUORIDES FROM FLUIDS

(76) Inventors: Marc Blachman, 965 Eastlawn Dr., Highland Heights, OH (US) 44143; Terence J. McHugh, 10777 Westheimer Rd., Suite 1100, Houston, TX (US) 77042

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,819

(22) Filed: Feb. 23, 2000

(65) Prior Publication Data

US 2003/0159994 A1 Aug. 28, 2003

(51) Int. Cl.$^7$ ............................ B01D 15/00; B01D 53/02
(52) U.S. Cl. ........................... 210/679; 95/131; 95/142; 210/690; 423/240 S; 585/823
(58) Field of Search .................. 95/131, 142; 210/679, 210/690; 423/240 R, 240 S; 585/820, 823

(56) References Cited

U.S. PATENT DOCUMENTS

| | | | | | |
|---|---|---|---|---|---|
| 5,283,369 A | * | 2/1994 | Clark et al. | ................... | 568/71 |
| 5,316,998 A | * | 5/1994 | Lee et al. | ................... | 210/679 |
| 5,505,926 A | * | 4/1996 | Lee et al. | ............... | 423/240 R |
| 5,688,479 A | * | 11/1997 | Chao | ...................... | 423/240 S |
| 6,060,033 A | * | 5/2000 | Cheng | ......................... | 95/131 |
| 6,200,544 B1 | * | 3/2001 | Blachman | ............... | 423/240 R |

* cited by examiner

*Primary Examiner*—Ivars Cintins
(74) *Attorney, Agent, or Firm*—Kuffner & Associates

(57) ABSTRACT

A new method for removing HF and related organic fluorides from fluid streams in which the fluoride species exist as impurities and, in particular, from hydrocarbon fluid streams containing no more than about 1.0% by weight total combined fluorides. The method consists of contacting the fluid stream with an adsorbent consisting essentially of activated alumina that has been treated with a promoter material selected from the oxides and phosphates of alkali metals and alkaline earth metals, and mixtures thereof. This is preferably accomplished by providing a suitable absorber vessel charged with the adsorbent to form a fixed bed, and then conducting the fluoride-contaminated fluid through the fixed bed, either in a downflow or an upflow manner.

11 Claims, No Drawings

PROCESS FOR REMOVING FLUORIDES FROM FLUIDS

FIELD OF THE INVENTION

This invention relates to an adsorbent for removing HF and related organic fluorides from fluid streams in which they are contained as impurities, in particular, from hydrocarbon fluid streams in petroleum refineries. This invention further relates to a method of using such adsorbent to remove HF and related organic fluoride compounds from fluid streams in which they are contained as impurities and, in particular, from hydrocarbon streams downstream from acid catalyzed alkylation processes.

BACKGROUND OF THE INVENTION

Hydrofluoric Acid Alkylation

The alkylation reaction as practiced in petroleum refining involves the condensation of an olefin (ethylene, propylene, butylenes, and amylenes) with isobutane to yield high-octane branched-chain hydrocarbons in the gasoline boiling range. Olefin feedstock for the alkylation reaction is typically that which is derived from the gas make of a catalytic cracker. Isobutane is usually obtained from refinery gas recovery or it is produced by catalytic butane isomerization. Alkylation can be accomplished as a thermal, thermal-catalytic, or catalytic reaction. Hydrofluoric Acid Alkylation is a catalytic reaction in which hydrofluoric acid (HF) is used as the catalyst.

As a result of the use of the hydrofluoric acid catalyst, HF Alkylation Unit effluent streams inevitably contain trace levels, that can be up to several hundred parts per million by weight, of fluoride-containing compounds, namely free hydrogen fluoride, related organic, or combined, fluorides, and mixtures thereof. These species are considered to be impurities or contaminants and must be removed in order to avoid corrosive effects and/or meet product specifications.

As used herein, the term "related organic fluorides" refers to those compounds that are formed in the HF Alkylation reactor by the addition of hydrofluoric acid across an olefinic double bond:

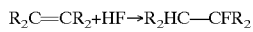

The term "combined fluorides" is synonymous with organic fluorides, thus referring chemical species resulting from the reaction, or combination, of HF with an unsaturated, or olefinic, organic compound. The term "total fluorides" refers to the summation of free HF and combined fluorides.

Both free HF and related organic fluorides present in the reactor effluent will throw salable LPG product off fluoride specifications as well as pose corrosion and environment concerns. One or more of the products from an HF Alkylation Unit operation may be treated for fluoride removal depending upon the end use of the material.

Fixed Bed Decomposition/Adsorption of Fluorides With Activated Alumna

Standard petroleum refining industry practice removes organic fluorides and residual free hydrofluoric acid in the effluent streams of petroleum refining acid catalyst alkylation units by means of fixed bed decomposition and adsorption using high surface area activated alumina as the catalyst/adsorbent media. These fixed bed absorbers are referred to as Defluorinators. The term high surface area activated alumina refers to an aluminum oxide compound of the general formula $AL_2O.H_2O$ having an extended surface area of above about 100 $m^2/g$, preferably above about 150 $m^2/g$. This degree of surface area imparts activity of the alumina towards a variety of chemical reactions.

In the present invention, the activated alumina catalyzes the decomposition of the combined fluoride to free hydrofluoric acid and olefin at elevated temperatures (350–475° F., 175–250° C.) as follows:

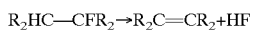

The free HF is removed from the process stream by subsequent reaction with the alumina to form aluminum trifluoride:

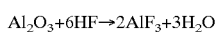

SUMMARY OF THE INVENTION

The present invention constitutes a new method for removing HF and related organic fluorides from fluid streams in which the fluoride species exist as impurities and, in particular, from hydrocarbon fluid streams containing up to 1000 ppm combined fluorides. The method of the invention consists of contacting the fluid stream with an adsorbent consisting essentially of activated alumina promoted with a compound selected from the oxides and phosphates of alkali metals and alkaline earth metals, and mixtures thereof. Thus, in essence, the method of this invention utilizes a base-promoted alumina adsorbent in place of the prior art non-promoted aluminas.

Bases utilized in this invention include alkaline and alkaline earth metal oxides and phosphates, and mixtures thereof. Particularly, the sodium, calcium, magnesium and potassium oxides and phosphates. When the base is an oxide, the activated alumina is promoted with $Na_2O$ and $K_2O$, and preferably sodium oxide ($Na_2O$). When the activated alumina is promoted with a phosphate, it may be selected from the group consisting of the phosphates of Li, Na, K, Be, Mg and Ca and, preferably, potassium phosphate. Cumulative promoter levels (oxide+phosphate) comprise between about 0.5 wt. % and about 25 wt. % of the activated alumina product. These bases are well known and have been used as promoters in other applications. However, their activity is generally based upon simple acid-base chemistry. Accordingly, the use of promoters with activated alumina in the context of the present invention was expected to provide additional HF loading capacity based upon that simple acid-base chemistry and the subsequent reaction of free HF with the promoter (together with the $Al_2O_3$), as shown below:

Unexpectedly, however, trials under actual refinery conditions indicated performance benefits far beyond those anticipated, including: Increased fluoride-loading capacity on a per weight basis exceeding 40% as compared to current non-promoted products; significantly improved activity towards catalyzing the decomposition of organic fluorides; significantly improved resistance to carbon fouling and deposition, and significantly improved mechanical integrity of spent (fully reacted) material, thereby simplifying spent material handling and disposal.

DETAILED DESCRIPTION OF THE INVENTION

Adsorbent Preparation

Methods for activation of alumina are well known in the art. One technique that has been found to be particularly useful is described in U.S. Pat. No. 2,915,365 (Saussol), incorporated herein by reference. In a common method of obtaining an activated alumina, an alumina hydrate, e.g. bauxite, is heated at a high temperature generally for a very short period of time in a process known as flash calcination. Typically, flash activation involves calcination at temperatures of 400° C.–1000° C. with contact times of the order of 1 to several seconds, typically about 1 second. During this activation, the alumina starting material is converted from a very low surface area hydrate to a high surface area material, typically having a surface area above 100 $m^2/g$.

As a starting material to obtain the activated alumina, any number of various aluminas or alumina containing materials can be employed. For example, essentially pure aluminas such as alumina trihydrate, pseudoboehmite, or alpha alumina monohydrate can be used. A particularly convenient source of alumina starting material is gibbsite, a form of alumina trihydrate, which is manufactured by the well-known Bayer process. This product is readily available commercially and typically has a particle size of 90–100 microns. In addition, the alumina containing material can comprise materials such as bauxite or, indeed, can be other alumina bearing sources such as beneficiated clays. Another useful source of alumina containing materials are aluminas, e.g. boehmite, obtained from the hydrolysis of aluminum alkoxides. In general, the starting material alumina should have a minimum alumina ($Al_2O_3$) content of at least about 40% by weight calculated on the basis of its dry weight, i.e., after ignition at 1000° C. for one hour. The alumina used in the adsorbent of the present invention must be reduced in size to the 1–25 micron range, either before or after being flash calcined, but in any event before being formed and promoted with alkali metal- or alkaline earth metal oxide according to the invention.

Methods of product forming are also well known to those skilled in the art. For example, one forming process utilizes a rotating pan to which is fed both dry activated alumina-based solid and water or aqueous-based solution. In this process, the activated alumina powder is fed to the pan nodulizer at a steady rate using a metered feed system. Water or an aqueous solution is sprayed onto and mixed with the alumina powder while in the constantly rotating pan. This process steadily turns the alumina powder into spheres whose finished size is dictated by the degree of tilt of the pan and the speed of the pan's rotation. Typical formed adsorbent product sizes range from 2 mm to 4 mm in diameter.

The formed material is then allowed to cure for some period of time, which may vary from several minutes to several days, under specific temperature and humidity conditions. The cured material is then thermally re-activated at a temperature between 300° C.–550° C., yielding an active formed product.

Promotion of the activated alumina after it has been activated is carried out by treating the alumina with alkali- or alkaline earth metal oxides and/or phosphates. This may be accomplished by one of three principle methods, each well known in the art, or some combination thereof:

Dry-blending—Dry blending involves incorporation of the promoter species by addition of the dry promoter or promoter precursor to the freshly activated alumina powder prior to the forming step. The dry component mixture is then blended with water or an aqueous solution during forming to yield a homogeneous mixture of promoted product.

Co-forming—Co-forming involves incorporation of the promoter species during the forming step in which freshly activated alumina powder is re-hydrated with the addition of water during product forming. In the co-forming process, the promoter species is dissolved in the water, resulting in the formed promoted product.

Impregnation—Impregnation involves the incorporation of the promoter species after the final thermal activation of the formed product by wetting the product with an aqueous solution containing the promoter species.

In cases where the promoter material has been introduced by impregnation, a simple drying procedure to remove excess water is generally the only additional processing step that needs to be performed. It will be understood, in this regard, that there are commercially available activated aluminas that can be employed as the alumina-containing material suitable for impregnating with the promoter material salt solution.

In the present invention, the preferred form of the adsorbent is as nodules, such as spheres. However, it will be recognized that any shape can be employed. Thus, cylindrically shaped pellets, irregular lumps, or virtually any other shape can be employed. In cases where the promoter material has been introduced in a dry-blending or co-forming production process in conjunction with the use of a thermally activated alumina, e.g. bauxite, alumina trihydrate, and the like, it is necessary to cure and thermally re-activate the formed product.

Removal of Fluorides from Fluids

The promoted activated alumina adsorbent of the present invention can be readily employed in the removal of fluorides from an industrial fluid, i.e., gas and liquid, stream in which the fluorides exist in low concentrations and are considered as a contaminant, or impurity. The fluid stream to be treated will typically contain less than about 1.0% by weight of total fluorides and may contain less than about 1000 ppm of total fluorides (HF+related organic, or combined, fluorides). Generally, the removal is accomplished by providing a suitable absorber vessel charged with the adsorbent in sufficient quantity to form a fixed bed, and then conducting the HF-contaminated fluid through the fixed bed, either in a downflow or an upflow manner. The fluorides are removed from the fluid stream, as discussed earlier, by a catalyzed scavenging process of converting total fluorides to HF and adsorbing the HF on the adsorbent as the fluid passes through the fixed bed.

It has been observed that the best scavenging activity can be achieved when the streams being treated contain no more than about 1.0% by weight of total fluorides. Larger quantities of fluorides in the streams can be treated but, unless special consideration is given to the size of the bed and the flow rate of the fluid stream through the bed, premature saturation of the adsorbent scavenger may result, with the possibility of having an undesired early breakthrough and consequent corrosion and environmental problems.

HF adsorption beds are typically configured as dual bed systems with beds oriented in series with lead-lag piping. Purification of fluoride-contaminated fluid streams according to the present invention is generally continued until the fluid exiting from the lead (primary) absorber bed is observed to have an HF content above a desired predetermined level. At this point, the lead bed is taken off line for adsorbent replacement. The fresh bed is then brought back on-line in the lag (secondary) position, with the previous lag bed being switched into the lead position. This cycling can thus continue indefinitely without interruption to service and no suffering of temporary HF breakthrough.

To more fully illustrate the invention, the following non-limiting examples are presented.

Example 1

Preparation of $Na_2O$-promoted Activated Alumina

This example describes the preparation of various adsorbents useful in the methods of the present invention, starting with gibbsite powder with addition of the chemical promoter species by co-forming.

Gibbsite powder was flash calcined at 950° C. to 1000° C. for 1 to 2 seconds to produce an alumina powder in a size range of 1–10 microns. The calcined product was determined to have a surface area of about 250 $m^2/g$ to about 300 $m^2/g$. The powdered calcined alumina was fed to a pan nodulizer and sprayed with an aqueous solution of sodium carbonate until the formed nodules reached the desired size of 1.5 to 3 millimeters in diameter. The concentration of the aqueous solution of sodium carbonate was such as to achieve a final $Na_2O$ content of approximately 4% by weight to aluminum oxide ($Al_2O_3$) in the final product. The formed nodules were cured at 100° C. for 12 hours. Following curing, the nodules were heat treated up to a final temperature of 420° C. for about 1 to 1.5 hours. At this point, the formed nodules constituted the final product. This product is available commercially as Fluorocel 830A, manufactured by Porocel Corporation, of Houston, Tex.

Example 2

Preparation of $K_3PO_4$-promoted Activated Alumina

This example describes the preparation of various adsorbents useful in the methods of the present invention, starting with gibbsite powder with addition of the chemical promoter species by impregnation.

Gibbsite powder was flash calcined at 950° C. to 1000° C. for 1 to 2 seconds to produce an alumina powder in a size range of 1–10 microns. The calcined alumina was determined to have a surface area of about 250 $m^2/g$ to about 300 $m^2/g$. The powdered calcined alumina was fed to a pan nodulizer and sprayed with water until the formed nodules reached the desired size of 1.5 to 3 millimeters in diameter. The formed nodules were cured at 100° C. for 6 hours. Following curing, the nodules were heat treated up to a final temperature of 420° C. for about 1 to 1.5 hours. Following heat treating and subsequent cooling to ambient temperature (5° C. to 40° C.), the nodules were wetted to incipient wetness with a solution of potassium phosphate ($K_3PO_4$). The concentration of the aqueous solution of potassium phosphate was such as to achieve a final $K_3PO_4$ content of approximately 8% by weight to aluminum oxide ($Al_2O_3$) in the final product. The treated nodules were then dried at 150° C. to remove moisture to produce the final product. This product is available commercially as Fluorocel 830B, manufactured by Porocel Corporation, of Houston, Tex.

Example 3

Test Basket Results

Five different fluoride adsorbents were evaluated for performance according to the method of the present invention by placing test baskets containing samples of the adsorbent directly inside a full-scale operating alkylation unit at a US oil refinery. Five baskets, each containing a different adsorbent, were evaluated. Three of the adsorbents tested were standard non-promoted activated alumina adsorbent products currently on the market. The remaining two adsorbents were samples of those whose preparations are detailed in Examples 1 and 2, above. Each test basket held approximately 3 to 4 lbs of material.

The operating unit in which the test baskets were installed was a defluorinator placed on the propane fraction of the HF Alkylation Unit effluent section. The defluorinator unit consists of two beds configured in series (lead-lag). Each bed holds 170 $ft^3$ of adsorbent. Typical operating conditions are 250 psig and 200° C. processing a liquid feed rate of 1300 to 1500 barrels per day. At operating conditions the process stream is in the gas phase. Baskets were placed in the top third (inlet portion) of the lag bed of the unit and remained there for two months of operation before being removed for evaluation.

Analytical results of the retrieved test baskets are shown in the Table below:

|  | Adsorbent Quantity | | Spent Material Analysis | | | Crush Strength | Fluoride Loading on Spent Material** | |
|---|---|---|---|---|---|---|---|---|
|  |  |  | Al | F | C |  | [Total F Wt] | [lbs F per ft³ |
| Sample | [ft³] | [lbs] | wt % | wt % | wt % | [lbs]^ | [lbs] | adsorbent] |
| Sample 1 | tb | tb | 32.6 | 39.0 | 2.6 | 19 | 4768 | 28.0 |
| Sample 2 | tb | tb | 31.7 | 45.1 | 3.0 | 19 | 5603 | 32.9 |
| Sample 3 | tb | tb | 33.2 | 45.4 | 2.5 | 21 | 4842 | 28.5 |
| Sample A (invention | tb | tb | 30.1 | 61.9 | 0.3 | 45 | 7917 | 46.6 |
| Sample B (invention | tb | tb | 30.4 | 57.9 | 0.7 | 68 | 7208 | 42.4 | tb = test basket holding approx. 1 liter (approx. 2 lbs) of HF adsorbent material
^Crush Strengths reported as a 5 mesh equivalent.
**All fluoride loading calculations are based upon weight % analyses of the spent sample and referenced back to a total aluminum weight in the sample, which is assumed to remain constant throughout the life of the material. Fluoride loadings as indicated by "Total F Wt" are extrapolated to a full bed of material consisting of 170 ft³ of adsorbent. "lbs F per ft³ adsorbent" value normalizes the "Total F Wt" to one cubic foot of adsorbent.

Example 4

Full Scale Results

A full-scale trial of the promoted alumina adsorbent of Example 1 was conducted at the same oil refinery as described in Example 3. The lag defluorinator bed was loaded with 8000 lbs (170 ft³) of the promoted alumina product. The average propane flow rate through the vessel at the time was 1300 to 1500 barrels per day at 250 psig and 200° C. The vessel remained in the lag position for six weeks of operation, after which it was moved into the lead position. The adsorbent continued to perform well for several additional weeks, until it was determined that the material was spent. The bed was changed out with the spent adsorbent being retrieved and analyzed. Samples were obtained from the top, middle and bottom portions of the bed, with analyses being compared to historical values obtained with non-promoted alumina.

|  | Adsorbent Quantity | | Spent Material Analysis | | | Crush Strength | Fluoride Loading on Spent Material** | |
|---|---|---|---|---|---|---|---|---|
|  |  |  | Al | F | C |  | [Total F Wt] | [lbs F per ft³ |
| Sample | [ft³] | [lbs] | wt % | wt % | wt % | [lbs]^ | [lbs] | adsorbent] |
| Historical | 170 | 7150 | 40.1 | 48.3 | 2.7 | 20 | 4777 | 28.1 |
| (top) | 170 | 8000 | 24.1 | 57.5 | 0.2 | 50 | 9196 | 54.1 |
| (mid) | 170 | 8000 | 30.2 | 56.9 | 0.3 | 47 | 7262 | 42.7 |
| (bottom) | 170 | 8000 | 31.5 | 56.7 | 0.3 | 49 | 6937 | 40.8 |

^Crush Strengths reported as a 5 mesh equivalent.
**All fluoride loading calculations are based upon weight % analyses of the spent sample and referenced back to a total aluminum weight in the sample, which is assumed to remain constant throughout the life of the material. Fluoride loadings as indicated by "Total F Wt" refer to a full bed of material consisting of 170 ft³ of adsorbent. "lbs F per ft³ adsorbent" value normalizes the "Total F Wt" to one cubic foot of adsorbent.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method for removing HF and related organic fluorides from a fluid stream exiting an alkylation unit, said fluid stream containing less than about 1.0% by weight of total HF and related organic fluorides as impurities, comprising passing said fluid stream at elevated temperatures between 175–250° C. through a fixed bed of activated alumina which has been promoted with a compound selected from the oxides and phosphates of alkali metals and alkaline earth metals, and mixtures thereof.

2. The method of claim 1 wherein the activated alumina is promoted with a promoter selected from the group consisting of the phosphates of Li, Na, K, Be, Mg and Ca.

3. The method of claim 2 wherein the promoter is potassium phosphate ($K_3PO_4$).

4. The method of claim 3 wherein the potassium phosphate is present at a final $K_3PO_4$ content of approximately 8% by weight to aluminum oxide ($Al_2O_3$) in the final promoter product.

5. The method of claim 1 wherein the activated alumina is promoted with sodium oxide.

6. The method of claim 5 wherein the sodium oxide is present in the promoter at a final $Na_2O$ content of approximately 4% by weight to aluminum oxide ($Al_2O_3$).

7. The method of claim 1 wherein the promoter comprises between about 0.5 wt.% and about 25 wt. % of the activated alumina.

8. The method of claim 1 wherein the fluid stream contains less than about 1000 ppm of total HF and related organic fluorides.

9. A method of removing HF and related organic fluorides from a contaminated alkylation effluent stream containing same as an impurity, which comprises providing a vessel charged with activated alumina that has been promoted with a compound selected from the oxides and phosphates of alkali metals and alkaline earth metals, and mixtures thereof, to form a fixed bed, and then conducting said alkylation effluent stream through the fixed bed at elevated temperatures between 175–250° C.

10. The method of claim 9 wherein the fluid stream is conducted through the fixed bed in a downflow manner.

11. The method of claim 9 wherein the fluid stream is conducted through the fixed bed in an upflow manner.

* * * * *